US009997882B1

(12) United States Patent
Warren (10) Patent No.: US 9,997,882 B1
(45) Date of Patent: Jun. 12, 2018

(54) ELECTRICAL CHARGING DEVICES AND ASSEMBLIES (71) Applicant: William J. Warren, Frisco, TX (US)

(72) Inventor: William J. Warren, Frisco, TX (US)

(*) Notice: Subject to any disclaimer, the term of this patent is extended or adjusted under 35 U.S.C. 154(b) by 0 days. days.

(21) Appl. No.: 15/697,307

(22) Filed: Sep. 6, 2017

Related U.S. Application Data (60) Provisional application No. 62/464,077, filed on Feb. 27, 2017, provisional application No. 62/464,517, filed on Feb. 28, 2017, provisional application No. 62/465,705, filed on Mar. 1, 2017, provisional application No. 62/465,871, filed on Mar. 2, 2017, provisional application No. 62/466,576, filed on Mar. 3, 2017, provisional application No. 62/473,225, filed on Mar. 17, 2017.

(51) Int. Cl.
| *H01R 31/06* | (2006.01) |
| *H01R 13/44* | (2006.01) |
| *H01R 13/66* | (2006.01) |
| *H01R 13/60* | (2006.01) |
| *H04M 1/04* | (2006.01) |
| *H01R 24/68* | (2011.01) |

(52) U.S. Cl.
CPC ........... *H01R 31/065* (2013.01); *H01R 13/44* (2013.01); *H01R 13/60* (2013.01); *H01R 13/6675* (2013.01); *H01R 24/68* (2013.01); *H04M 1/04* (2013.01)

(58) Field of Classification Search
CPC ...... H01R 31/065; H01R 13/44; H01R 13/60; H01R 13/6675
USPC ........................................................ 439/638
See application file for complete search history.

(56) References Cited

U.S. PATENT DOCUMENTS

| 2,392,445 | A | | 1/1946 | Anderson |
| 4,536,694 | A | | 8/1985 | McCarty et al. |
| 5,305,381 | A | | 4/1994 | Wang et al. |
| 5,587,645 | A | | 12/1996 | Sciammarella et al. |
| 5,648,712 | A | * | 7/1997 | Hahn ............... H01R 27/00 320/111 |
| 5,679,017 | A | | 10/1997 | Smith |
| 5,762,512 | A | | 6/1998 | Trant et al. |

(Continued)

FOREIGN PATENT DOCUMENTS

| EP | 2228263 A1 | 9/2010 |
| WO | WO2016003585 A1 | 1/2016 |

OTHER PUBLICATIONS

International Search Report and Written Opinion dated Sep. 4, 2015 for Patent Cooperation Treaty Application PCT/US2015/034073, filed Jun. 3, 2015, 8 pages.

*Primary Examiner* — Alexander Gilman
(74) *Attorney, Agent, or Firm* — Carr & Ferrell LLP (57) ABSTRACT Electrical charging devices and assemblies are provided herein. An example apparatus includes a cradle configured to receive and retain an electronic device, side rail tracks extending below the cradle, an electronics tray defining a recess that receives an interchangeable electronics assembly, the interchangeable electronics assembly having electrical conductors, means for electrically coupling the interchangeable electronics assembly with the electronic device, when the electronics tray is coupled with the side rail tracks, and the interchangeable electronics assembly being disposed inside the recess such that the electrical conductors protrude from the electronics tray.

17 Claims, 4 Drawing Sheets

(56) References Cited

U.S. PATENT DOCUMENTS

| | | | | |
|---|---|---|---|---|
| 6,091,611 A * | 7/2000 | Lanni | | H02J 7/0008 |
| | | | | 307/151 |
| 6,341,218 B1 * | 1/2002 | Poplawsky | | B60R 11/0241 |
| | | | | 379/420.01 |
| 6,510,067 B1 | 1/2003 | Toebes | | |
| 6,518,724 B2 | 2/2003 | Janik | | |
| 6,831,848 B2 * | 12/2004 | Lanni | | H02J 7/022 |
| | | | | 307/38 |
| 6,848,802 B2 | 2/2005 | Chen | | |
| 6,861,822 B2 * | 3/2005 | Wei | | H01R 13/60 |
| | | | | 320/111 |
| 6,938,867 B2 | 9/2005 | Dirks | | |
| 7,066,767 B2 | 6/2006 | Liao | | |
| 7,075,779 B2 | 7/2006 | Bothe et al. | | |
| 7,166,987 B2 * | 1/2007 | Lee | | A45F 5/00 |
| | | | | 320/114 |
| 7,254,424 B1 | 8/2007 | Reichert | | |
| 7,524,197 B2 | 4/2009 | Mills et al. | | |
| 7,528,323 B2 | 5/2009 | Wu et al. | | |
| 7,540,748 B2 | 6/2009 | Tracy et al. | | |
| 7,623,182 B2 * | 11/2009 | Byrne | | H04N 1/00127 |
| | | | | 348/373 |
| 7,654,855 B2 | 2/2010 | Liao | | |
| 7,682,185 B2 | 3/2010 | Liao | | |
| 7,699,664 B2 | 4/2010 | Kim et al. | | |
| 7,850,484 B2 | 12/2010 | Hayashi et al. | | |
| 7,857,659 B2 | 12/2010 | Wang et al. | | |
| 7,887,341 B2 | 2/2011 | Liao | | |
| 8,113,873 B1 | 2/2012 | Sarraf | | |
| 8,224,408 B2 * | 7/2012 | Tomasini | | H04M 1/04 |
| | | | | 455/569.2 |
| D676,380 S | 2/2013 | Sun | | |
| 8,367,235 B2 * | 2/2013 | Huang | | H01M 2/1022 |
| | | | | 361/679.56 |
| 8,414,318 B1 * | 4/2013 | Chen | | H01R 35/04 |
| | | | | 439/173 |
| 8,415,920 B2 * | 4/2013 | Liao | | H02J 7/0042 |
| | | | | 16/225 |
| D687,375 S | 8/2013 | Franco | | |
| 8,686,683 B2 * | 4/2014 | Caskey | | H01R 13/6675 |
| | | | | 320/107 |
| 8,712,482 B2 | 4/2014 | Sorias et al. | | |
| 8,794,997 B2 | 8/2014 | Tin | | |
| 8,805,640 B2 * | 8/2014 | Nielsen | | G06F 1/1632 |
| | | | | 702/130 |
| 8,864,517 B2 | 10/2014 | Cohen | | |
| D723,457 S | 3/2015 | Sorias | | |
| 9,130,332 B2 * | 9/2015 | Yosef | | H01R 31/06 |
| 9,161,464 B2 | 10/2015 | Liao | | |
| 9,310,841 B2 * | 4/2016 | Williams | | G06F 1/1632 |
| 9,356,454 B2 | 5/2016 | Caren et al. | | |
| D760,647 S | 7/2016 | Chen | | |
| D762,169 S | 7/2016 | Lei | | |
| 9,429,994 B1 * | 8/2016 | Vier | | G06F 1/1656 |
| 9,473,607 B2 * | 10/2016 | An | | H04M 1/11 |
| D783,526 S | 4/2017 | Warren | | |
| 9,620,911 B2 * | 4/2017 | Warren | | H01R 13/6675 |
| 9,627,802 B2 * | 4/2017 | Warren | | H01R 13/60 |
| D791,070 S | 7/2017 | Son | | |
| D791,076 S | 7/2017 | Kim | | |
| D791,697 S | 7/2017 | Precheur | | |
| D795,190 S | 8/2017 | Tzeng | | |
| 9,742,107 B2 | 8/2017 | Choi et al. | | |
| 9,812,811 B1 * | 11/2017 | Gorin | | H01R 13/60 |
| 2002/0149695 A1 * | 10/2002 | Kayanuma | | H04N 1/00127 |
| | | | | 348/375 |
| 2003/0218445 A1 | 11/2003 | Behar | | |
| 2004/0105024 A1 * | 6/2004 | Takahashi | | H04N 1/00291 |
| | | | | 348/333.01 |
| 2004/0251873 A1 * | 12/2004 | Simoes | | H01R 31/06 |
| | | | | 320/114 |
| 2005/0178633 A1 | 8/2005 | Liao | | |
| 2006/0105819 A1 * | 5/2006 | Liao | | B60R 11/0241 |
| | | | | 455/569.2 |
| 2006/0194467 A1 | 8/2006 | Beasley et al. | | |
| 2007/0258204 A1 | 11/2007 | Chang et al. | | |
| 2008/0157715 A1 * | 7/2008 | Rosenboom | | H02J 7/0044 |
| | | | | 320/108 |
| 2008/0227380 A1 * | 9/2008 | Hsu | | G11B 33/025 |
| | | | | 454/184 |
| 2009/0047827 A1 | 2/2009 | Liao | | |
| 2012/0049800 A1 * | 3/2012 | Johnson | | H02J 7/0044 |
| | | | | 320/111 |
| 2012/0077361 A1 | 3/2012 | Youssefi-Shams et al. | | |
| 2012/0178506 A1 * | 7/2012 | Sorias | | H02J 7/0042 |
| | | | | 455/573 |
| 2012/0214348 A1 * | 8/2012 | Youssefi-Shams | | H01R 13/44 |
| | | | | 439/638 |
| 2013/0057215 A1 | 3/2013 | Rajeswaran et al. | | |
| 2013/0150134 A1 | 6/2013 | Pliner et al. | | |
| 2013/0178252 A1 * | 7/2013 | Sorias | | H02J 7/0042 |
| | | | | 455/573 |
| 2014/0030912 A1 | 1/2014 | Cohen | | |
| 2015/0011265 A1 | 1/2015 | Walsh, Jr. | | |
| 2015/0015204 A1 | 1/2015 | Sorias et al. | | |
| 2015/0207286 A1 | 7/2015 | Chen et al. | | |
| 2015/0207350 A1 | 7/2015 | Chen et al. | | |
| 2015/0263447 A1 | 9/2015 | Liao | | |
| 2015/0380872 A1 | 12/2015 | Warren | | |
| 2016/0087381 A1 * | 3/2016 | Wong | | H01R 13/73 |
| | | | | 439/529 |
| 2016/0118758 A1 | 4/2016 | Cymerman | | |
| 2016/0141815 A1 | 5/2016 | Warren | | |
| 2016/0204816 A1 | 7/2016 | Abramovich | | |
| 2016/0209885 A1 | 7/2016 | Ellis | | |
| 2016/0218536 A1 | 7/2016 | Caren et al. | | |
| 2016/0261129 A1 * | 9/2016 | Warren | | H01R 31/065 |
| 2016/0380457 A1 | 12/2016 | Criss | | |
| 2017/0005496 A1 | 1/2017 | Warren | | |
| 2017/0012450 A1 | 1/2017 | Warren | | |
| 2017/0101256 A1 | 4/2017 | Zeitlin | | |
| 2017/0163080 A1 | 6/2017 | Warren | | |

* cited by examiner

ELECTRICAL CHARGING DEVICES AND ASSEMBLIES

CROSS-REFERENCE TO RELATED APPLICATIONS

The present application claims the benefit of U.S. Provisional Application No. 62/464,077, filed on Feb. 27, 2017, of U.S. Provisional Application No. 62/464,517, filed on Feb. 28, 2017, of U.S. Provisional Application No. 62/465,705, filed on Mar. 1, 2017, of U.S. Provisional Application No. 62/465,871, filed on Mar. 2, 2017, of U.S. Provisional Application No. 62/466,576, filed on Mar. 3, 2017, and of U.S. Provisional Application No. 62/473,225, filed on Mar. 17, 2017. All of these applications are hereby incorporated by reference herein in their entireties, including all references cited therein.

FIELD

The present technology pertains to devices for electronic charging, and more specifically, but not by way of limitation, to electronic charging stations that couple with a wall outlet, as well as receive and retain an electronic device such as a Smartphone, tablet, laptop, and so forth, during charging.

SUMMARY

Various embodiments of the present disclosure are directed to an apparatus, including: a cradle configured to receive and retain an electronic device; side rail tracks extending below the cradle; an electronics tray including: an upper portion; a lower portion, where the upper portion is spaced apart from the lower portion so as to create a groove; a sidewall defining a recess that receives an interchangeable electronics assembly, the interchangeable electronics assembly including electrical conductors. The apparatus can also include a means for electrically coupling the interchangeable electronics assembly with the electronic device, when the electronics tray is coupled with the side rail tracks. The apparatus can further include the interchangeable electronics assembly being disposed inside the recess such that the electrical conductors protrude from the electronics tray, and the upper portion of the electronics tray being slid onto the side rail tracks.

Various embodiments of the present disclosure are directed to an apparatus, including: a cradle configured to receive and retain an electronic device; side rail tracks extending below the cradle; an electronics tray including a recess that receives an interchangeable electronics assembly, the interchangeable electronics assembly including electrical conductors; means for electrically coupling the interchangeable electronics assembly with the electronic device, when the electronics tray is coupled with the side rail tracks; and the interchangeable electronics assembly being disposed inside the recess such that the electrical conductors protrude from the electronics tray.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

Generally described, the present technology involves devices that are used to charge electronic devices. Example types of electronic devices that can be charged using the present technology include, but are not limited to, cellular telephones, Smartphones, PDAs, tablets, phablets, laptops, or any other mobile electronic device that requires recharging through an electrical interface or charging port.

Turning now to FIGS. 1-5, which collectively illustrate an example apparatus ("device 100"), constructed in accordance with the present technology. A device 100 comprises a cradle 102, side rail tracks 104 and 106, an interchangeable electronics assembly 107, as well as an electronics tray 108.

Figure 1:
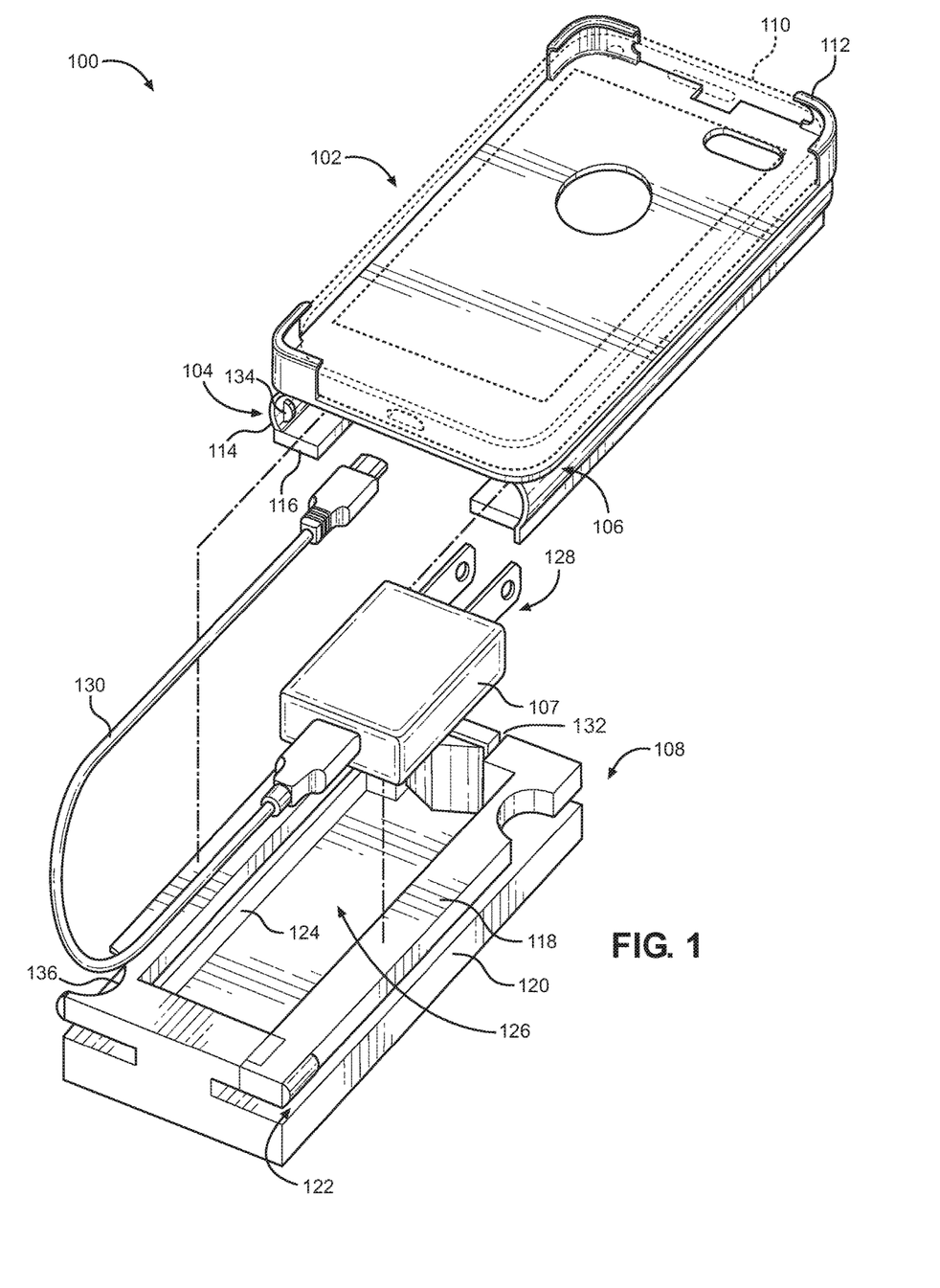
FIG. 1 is an exploded perspective view of an example apparatus of the present technology.

Generally, the cradle 102 is configured to receive and retain an electronic device 110, which can comprise a Smartphone, cellphone, computer, laptop, or other similar device.

The cradle 102 can comprise retaining features that allow the electronic device 110 to be retained therein. For example, overlapping corner tabs such as tab 112 can be utilized.

Extending from an underside of the cradle 102 are the side rail tracks 104 and 106. Each of the side rail tracks comprises a substantially L-shaped and elongated member that comprises a downwardly extending linear section 114 and an inwardly extending portion 116 that extends approximately perpendicularly to the downwardly extending linear section 114. The side rail tracks each have a downwardly extending linear section that extends toward one another.

In some embodiments, electronics tray 108 comprises an upper portion 118 and a lower portion 120. The upper portion 118 is spaced apart from the lower portion 120 so as to create a groove 122 or spacing.

The lower portion 120 can comprise a sidewall 124 that defines a recess 126 that receives the interchangeable electronics assembly 107. In some embodiments, the upper portion 118 and lower portion 120 can cooperate to define the recess 126.

In various embodiments, the interchangeable electronics assembly 107 comprises an electrical conductor 128. This can comprise any suitable electrical charging interface, such as a USB interface, electrical prongs configured for insertion into an outlet, or other similar electrical charging interface that would be known in the art, such as power over Ethernet, FireWire, MIDI, Thunderbolt, and so forth.

In some embodiments, the device 100 can comprise a means for electrically coupling 130 the interchangeable electronics assembly 107 with the electronic device 110. This can include a plug or connector that mates with another connector or conductor when the electronics tray 108 is coupled with the side rail tracks.

By way of example, the means for electrically coupling 130 can comprise a cable, a magnetic cable, a wire, and the like that couples the electronic device 110 and the interchangeable electronics assembly 107.

In some embodiments, the upper portion 118 of the electronics tray 108 comprises one or more openings 132, such as notches or slits that allow the electrical conductor 128 to protrude through the upper portion 118.

According to some embodiments, the interchangeable electronics assembly 107 is disposed inside the recess 126 such that the electrical conductor 128 protrudes from the electronics tray 108.

In one embodiment, the interchangeable electronics assembly 107 can comprise a printed circuit board with various permutations of electrical components. In various embodiments, the interchangeable electronics assembly 107 is configured to transform the AC power waveform received from an outlet into DC power that is appropriate for charging the electronic device 110.

In some embodiments, the interchangeable electronics assembly 107 can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

In other embodiments, the interchangeable electronics assembly 107 is an advanced flyback switching power supply that receives the AC voltage in ranges of 100 to 240 volts, and produces approximately five watts of smooth voltage power. AC line power is converted to high voltage DC current using a diode bridge. The DC power is switched off and on by a transistor controlled by a power supply controller IC.

In some embodiments, the chopped DC power supply is fed back in to a flyback transformer, which converts the DC power to a low voltage AC waveform. The AC waveform is then converted into DC, which is filtered with a filter to obtain smooth power that is substantially free of interference. The interchangeable electronics assembly 107 can comprise a feedback circuit that measures the voltage output to the electrical connector (e.g., prongs or USB, for example) and sends a signal to the controller IC, which adjusts the switching frequency to obtain a desired voltage.

In various embodiments, the interchangeable electronics assembly 107 can be an inductive charging base. The inductive charging base can include at least one primary (induction) coil (also known as a sender coil), a battery, and a charging interface. The primary coil can produce an alternating electromagnetic field (or inductive field) within the inductive charging base. The electromagnetic field can be used to charge one or more electronic devices, such as electronic device 110. The electronic device 110 can have at least one secondary (induction) coil (also known as a receiver coil) that can receive power from the electromagnetic field and convert the power into electric current that may be used to charge the battery of electronic device 110. When the primary coil in the inductive charging base and the secondary coil in the electronic device 110 are in close proximity, the two induction coils combine to form an electrical transformer.

The side rail tracks can comprise at least one protrusion 134 facing inwardly (e.g., disposed on the downwardly extending linear section of side rail track 106). The protrusion 134 comprises a portion of a locking/securement mechanism. The second portion of this locking/securement mechanism comprises a notch 136 fabricated into the upper portion 118.

When the electronics tray 108 is slid within the side rail tracks 104 and 106, the cradle 102 and the electronics tray 108 are secured together when the protrusion 134 falls into the notch 136. That is, the protrusion 134 and notch 136 function cooperatively as a detent.

Figure 2A:
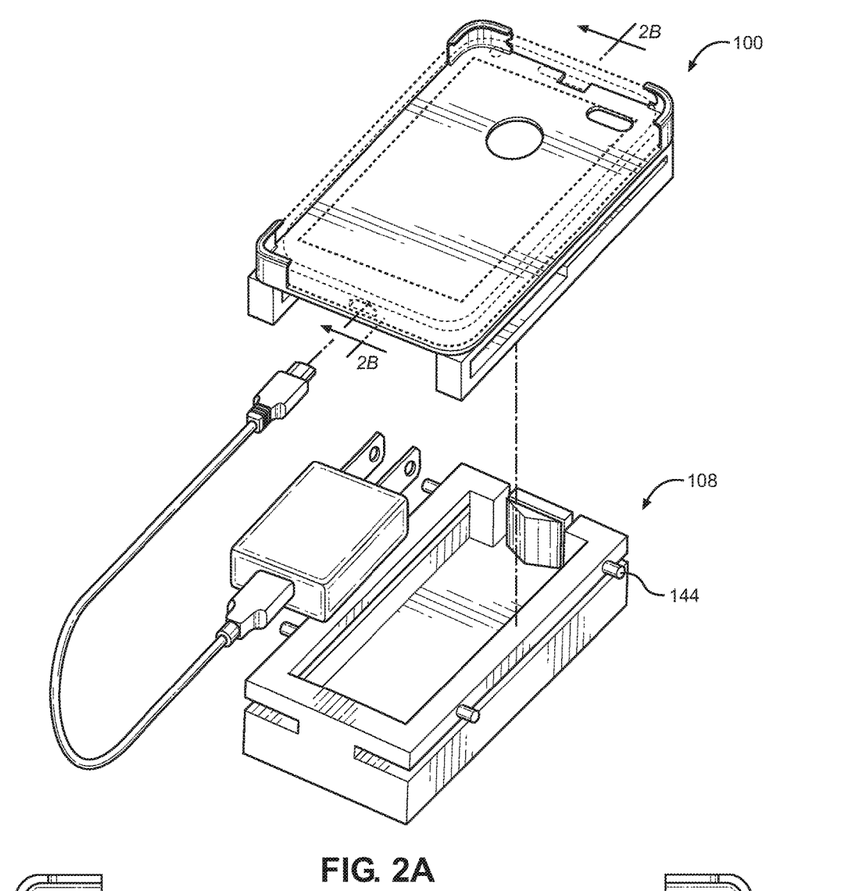
FIG. 2A is an exploded perspective view of an example apparatus of the present technology.
Figure 2B:
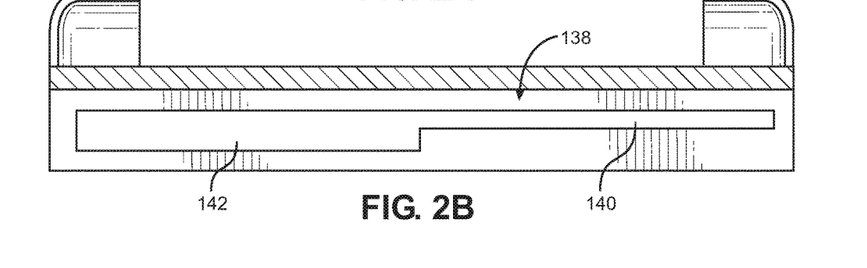
FIG. 2B is a partial cross-sectional view of the example apparatus of FIG. 2A.

In some embodiments, the side rail tracks each comprises a bi-level groove (such as bi-level groove 138) as illustrated in FIGS. 2A-B. The bi-level groove 138 comprises a narrow section 140 and a wide section 142.

The bi-level groove 138 cooperates with pegs manufactured onto the electronics tray 108. For example, the upper portion 118 of the electronics tray 108 comprises pegs, such as peg 144, that extend laterally into the bi-level grooves of the side rail tracks. It will be understood that movement of the electronics tray 108 along the side rail tracks cause a portion of the pegs (such the front pegs) to drop into a lower portion (wide section 142) of the bi-level grooves.

This movement allows a front of the device 100 to angle downwardly when the electronics tray 108 is slid forwardly.

Figure 3:
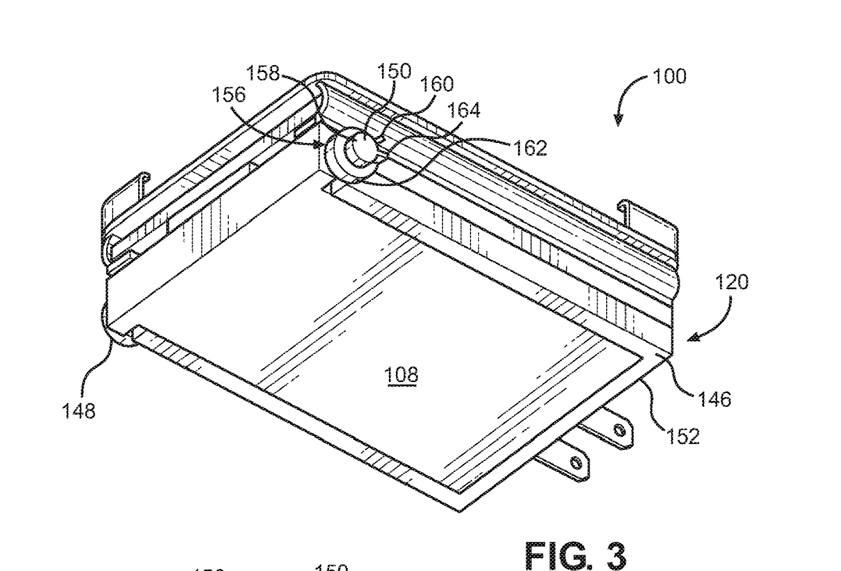
FIG. 3 is a perspective view of an example apparatus in a stored configuration.

As illustrated in FIG. 3, the device 100 can comprise a stabilizer 146 in pivoting connection with the lower portion 120 of the electronics tray 108. The stabilizer functions to support the device 100 against a supporting surface, such as a wall, when the electronics tray 108 is coupled with an outlet on the wall, as illustrated in FIG. 4.

In some embodiments, the stabilizer 146 comprises a u-shaped bar that is coupled to the lower portion 120 of the electronics tray 108 via pivoting members 148 and 150. The stabilizer 146 comprises a front section 152 that extends forwardly of a front of the electronics tray 108. In some embodiments, the stabilizer 146 is capable of being disposed in a deployed configuration (see FIG. 5) such that the stabilizer 146 contacts a supporting surface when the electrical conductors are inserted into an outlet.

Figure 4:
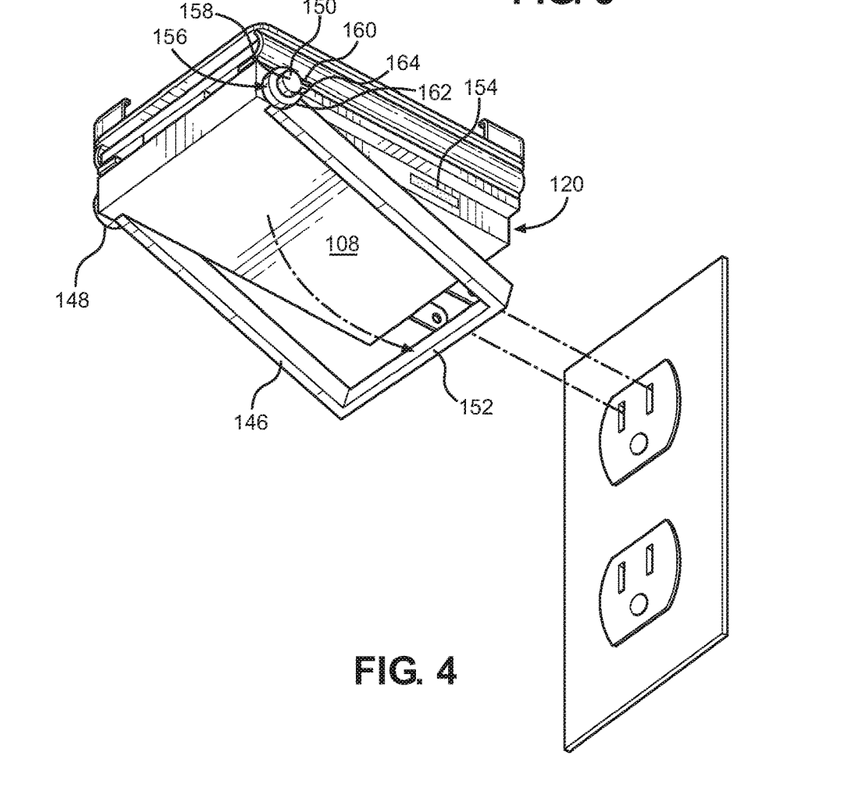
FIG. 4 is a perspective view of an example apparatus in a deployed configuration.

According to some embodiments, the device 100 can comprise a means for locking 154 the stabilizer 146 into a secured configuration, as illustrated in FIG. 4. This includes the stabilizer 146 being disposed around three sides of the lower portion 120 of the electronics tray 108. The means for locking 154 can comprise magnetic strips disposed on an outer surface of the lower portion 120 and corresponding magnetic surfaces on the stabilizer 146. Force is required to break the magnetic force used to secure the stabilizer 146 in the secured configuration.

As illustrated in FIG. 4, the device 100 (only illustrating a portion thereof) can comprise a means for limiting 156 the stabilizer 146 when in the deployed configuration. In one embodiment, the means for limiting 156 comprises a fixed position shaft 158 extending through the lower portion 120 (also see FIG. 3). The fixed position shaft 158 does not rotate in some embodiments. In some embodiments, the fixed position shaft 158 comprises fixed stops, such as shaft stop 160 arranged on the fixed position shaft. The pivoting members 148 and 150 each comprises a collar, such as collar 162 that rotates around the fixed position shaft 158 (also see FIG. 3). The collars each comprise a collar stop 164. In some embodiments, the collar stop 164 engages with the shaft stop 160 on the fixed position shaft 158 to limit rotation (specifically excessive downward rotation) of the stabilizer 146.

When the stabilizer 146 is rotated downwardly, the collar stop 164 rests against the fixed shaft stop 160, thereby limiting over rotation of the stabilizer 146 is rotated.

Figure 5:
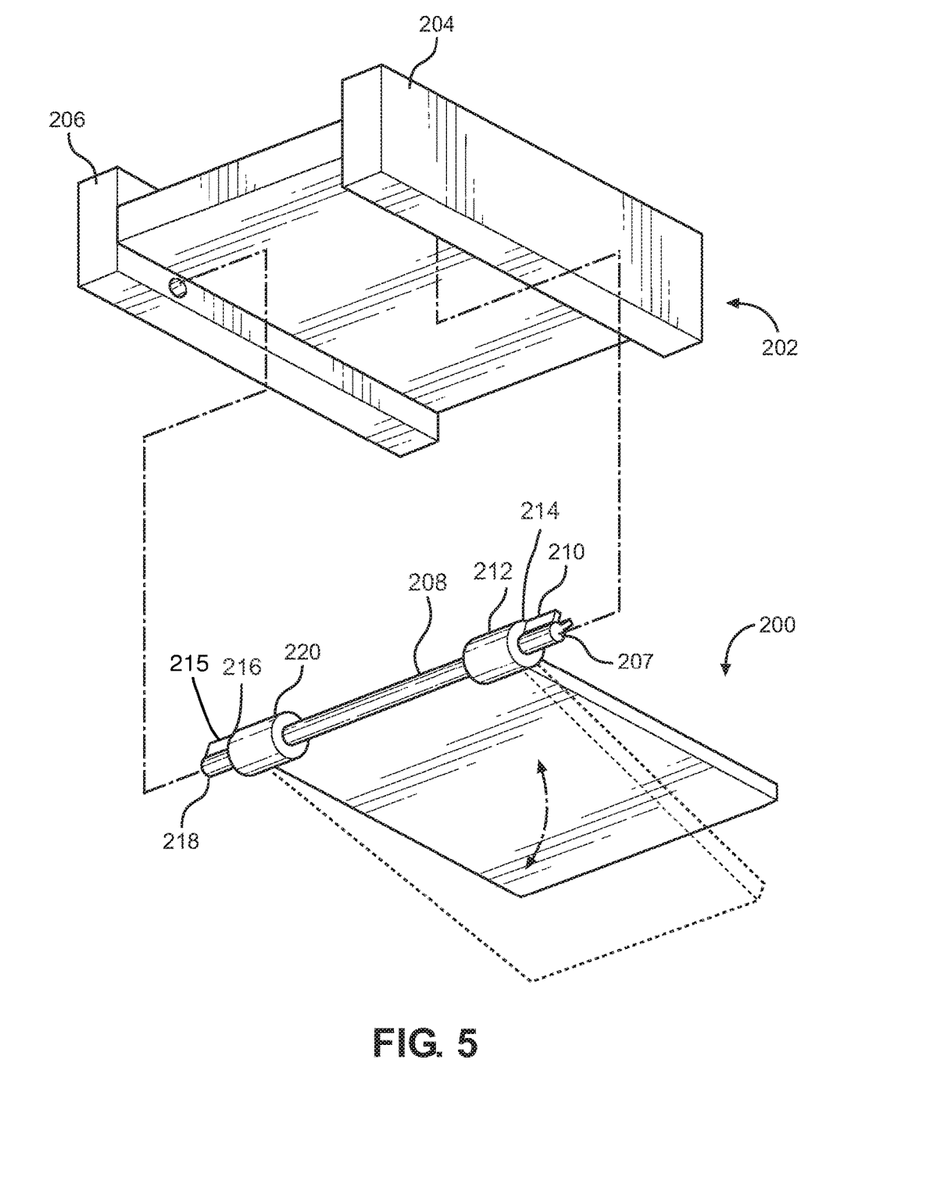
FIG. 5 is a perspective view of an example lower portion of an electronics tray having another example stabilizer.

FIG. 5 illustrates another embodiment of the present disclosure where the apparatus comprises a plate type stabilizer 200 rather than the bar-shaped stabilizer described above. Another embodiment of a lower portion 202 is also utilized. The lower portion 202 comprises various electronics for converting or otherwise processing electricity so as to convert it into a usable charge for recharging an electronic device.

The lower portion 202 is configured to slide linearly between two struts 204 and 206 of the lower portion 202.

The stabilizer 200 is a rectangular plate in some embodiments. The lower portion 202 can be coupled with the stabilizer 200 in such a way that as the lower portion and its electronics are translated forwardly, the stabilizer 200 moves into a stored configuration. In more detail, fixed position shaft 208 extends between the two struts 204 and 206. A fixed stop 207 is located along the fixed position shaft 208, extending radially therefrom. In some embodiments, a stabilizer stop 210 is utilized and can extend from a fixed wheel 212 that is engaged with strut 204. The stabilizer 200 is coupled to the fixed position shaft 208 using collars 214 and 216. The collars 214 and 216 allow for the stabilizer 200 to rotate around the shaft, as well as translate laterally along the fixed position shaft 208.

When the stabilizer 200 is not in use, the stabilizer 200 rests on the stabilizer stop 210. When the stabilizer 200 is needed, the stabilizer 200 can be translated laterally away from the stabilizer stop 210. When free of the stabilizer stop 210, the stabilizer 200 can rotate downwardly. In some embodiments, a second stabilizer stop 215 is utilized and can extend from a fixed wheel 220 that is engaged with strut 206 on an opposing side of the fixed position shaft 208. This second stabilizer 218 is positioned at a radial position that is different than that of the stabilizer stop 210, allowing the stabilizer 200 to stop at a downwardly rotated position (deployed).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An apparatus, comprising:
   a cradle configured to receive and retain an electronic device;
   side rail tracks extending below the cradle;
   an electronics tray comprising:
      an upper portion;
      a lower portion, wherein the upper portion is spaced apart from the lower portion so as to create a groove; and
      a sidewall defining a recess that receives an interchangeable electronics assembly, the interchangeable electronics assembly comprising electrical conductors;
   means for electrically coupling the interchangeable electronics assembly with the electronic device, when the electronics tray is coupled with the side rail tracks; and
   the interchangeable electronics assembly being disposed inside the recess such that the electrical conductors protrude from the electronics tray, and the upper portion of the electronics tray being slid onto the side rail tracks.

2. The apparatus according to claim 1, wherein the upper portion of the electronics tray comprises openings that allow the electrical conductors to protrude therethrough.

3. The apparatus according to claim 1, wherein the upper portion of the electronics tray comprises at least one notch.

4. The apparatus according to claim 3, further comprising a protrusion on the side rail tracks facing inwardly, the protrusion mating with and into the at least one notch when the electronics tray is slid onto the side rail tracks, so as to secure the cradle and the electronics tray together.

5. The apparatus according to claim 1, wherein the side rail tracks each comprise a bi-level groove.

6. The apparatus according to claim 5, wherein the upper portion of the electronics tray comprises pegs that extend laterally into the bi-level groove of each of the side rail tracks, further wherein movement of the electronics tray along the side rail tracks cause a portion of the pegs to drop into a lower portion of the bi-level groove of each of the side rail tracks.

7. The apparatus according to claim 1, further comprising a stabilizer in pivoting connection with the lower portion of the electronics tray.

8. The apparatus according to claim 7, wherein the stabilizer is a U-shaped bar that is coupled to the lower portion of the electronics tray via pivoting members, the stabilizer having a front section that extends forwardly of a front of the electronics tray, the stabilizer capable of being disposed in a deployed configuration such that the stabilizer contacts a supporting surface when the electrical conductors are inserted into an outlet.

9. The apparatus according to claim 8, further comprising a means for locking the stabilizer into a secured configuration.

10. The apparatus according to claim 9, further comprising a means for limiting the stabilizer when in the deployed configuration.

11. The apparatus according to claim 10, wherein the means for limiting the stabilizer when in the deployed configuration comprises:
    a fixed position shaft extending through the lower portion of the electronics tray; and
    fixed stops arranged on the fixed position shaft.

12. The apparatus according to claim 11, wherein the pivoting members comprise collars that rotate around the fixed position shaft, the collars each comprising a collar stop, wherein the collar stop on each of the collars engages with the fixed stops to limit rotation of the stabilizer.

13. The apparatus according to claim 1, further comprising a stabilizer plate disposed between parallel sides of the lower portion of the electronics tray, the stabilizer plate being rotatably associated with a fixed position shaft using collars that rotatably couple with the fixed position shaft, wherein the stabilizer plate can translate laterally on the fixed position shaft.

14. The apparatus according to claim 13, further comprising a fixed stop arranged on the fixed position shaft, wherein at least one of the collars comprise a collar stop that engages with the fixed stop to secure the stabilizer plate in a deployed configuration.

15. The apparatus according to claim 1, wherein the electrical conductors comprise any of prongs, USB interfaces, micro SD interfaces, lightning interfaces, and combinations thereof.

16. An apparatus, comprising:
    a cradle configured to receive and retain an electronic device;
    side rail tracks extending below the cradle;
    an electronics tray comprising a recess that receives an interchangeable electronics assembly, the interchangeable electronics assembly comprising electrical conductors;
    means for electrically coupling the interchangeable electronics assembly with the electronic device, when the electronics tray is coupled with the side rail tracks; and
    the interchangeable electronics assembly being disposed inside the recess such that the electrical conductors protrude from the electronics tray.

17. The apparatus according to claim 16, wherein the side rail tracks each comprise a substantially L-shaped cross section and having inwardly extending portions, the electronics tray comprising a groove, the inwardly extending portions traveling within the groove and supporting the electronics tray.

* * * * *